Jan. 7, 1964   N. E. DARLING   3,116,713
MILKING SYSTEM
Filed Aug. 24, 1961   2 Sheets-Sheet 1

INVENTOR
NORMAN E. DARLING

BY *Fred L. Witherspoon, Jr.*
*Fred. E. Shoemaker*
ATTORNEYS

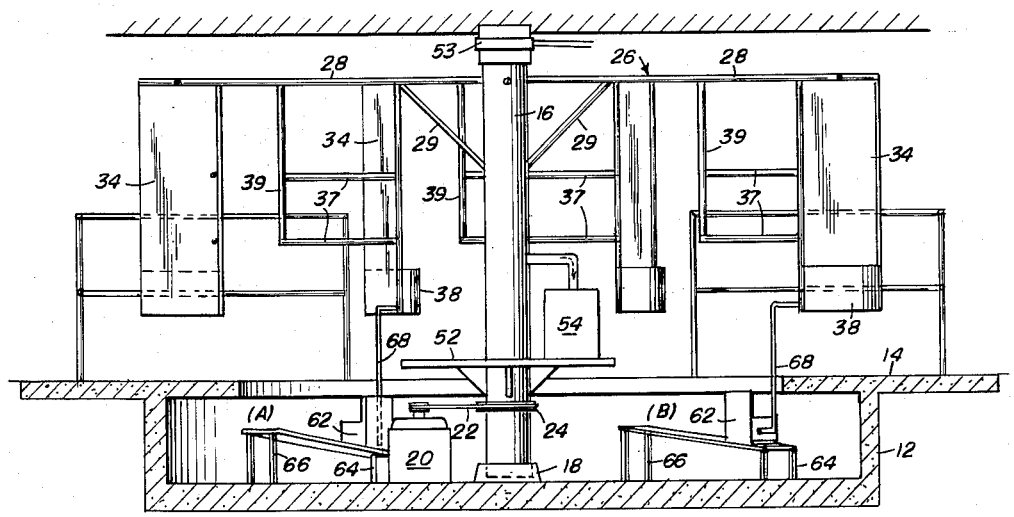

United States Patent Office 3,116,713
Patented Jan. 7, 1964

3,116,713
MILKING SYSTEM
Norman E. Darling, Warren Center, Pa.
Filed Aug. 24, 1961, Ser. No. 133,609
7 Claims. (Cl. 119—14.04)

This invention relates to a milking system and more particularly to milking apparatus in the form of a rotating assemblage of stalls adapted to handle a plurality of cows.

It is an object of this invention to provide a simple and inexpensive rotary type milking system for handling a plurality of cows.

It is another object of this invention to provide a rotary assemblage of stalls so arranged that the entire milking operation may be handled by two operators.

It is yet another object of this invention to provide a rotary milking system wherein the cows walk around a prescribed course within stalls which are rotated around this course by power means.

It is a still further object of this invention to provide a rotary milking system for a plurality of cows comprising a stall framework, means for centrally supporting said framework, the framework having a plurality of arms extending radially outward from said supporting means, cross pieces connecting the ends of the arms to form with adjacent pairs of arms a plurality of stall segments, means extending downwardly from the end portions of the arms to act as partitions to define the fore and aft portions and means for rotating the stall framework.

The above and other objects and advantages will become more apparent when taken in conjunction with the following detailed description and drawings, showing by way of example one preferred form of this invention and wherein:

FIGURE 2 is a combined elevational and sectional view taken along line 2—2 of FIGURE 1 and showing the relationship of the various components of this system.

Figure 1:
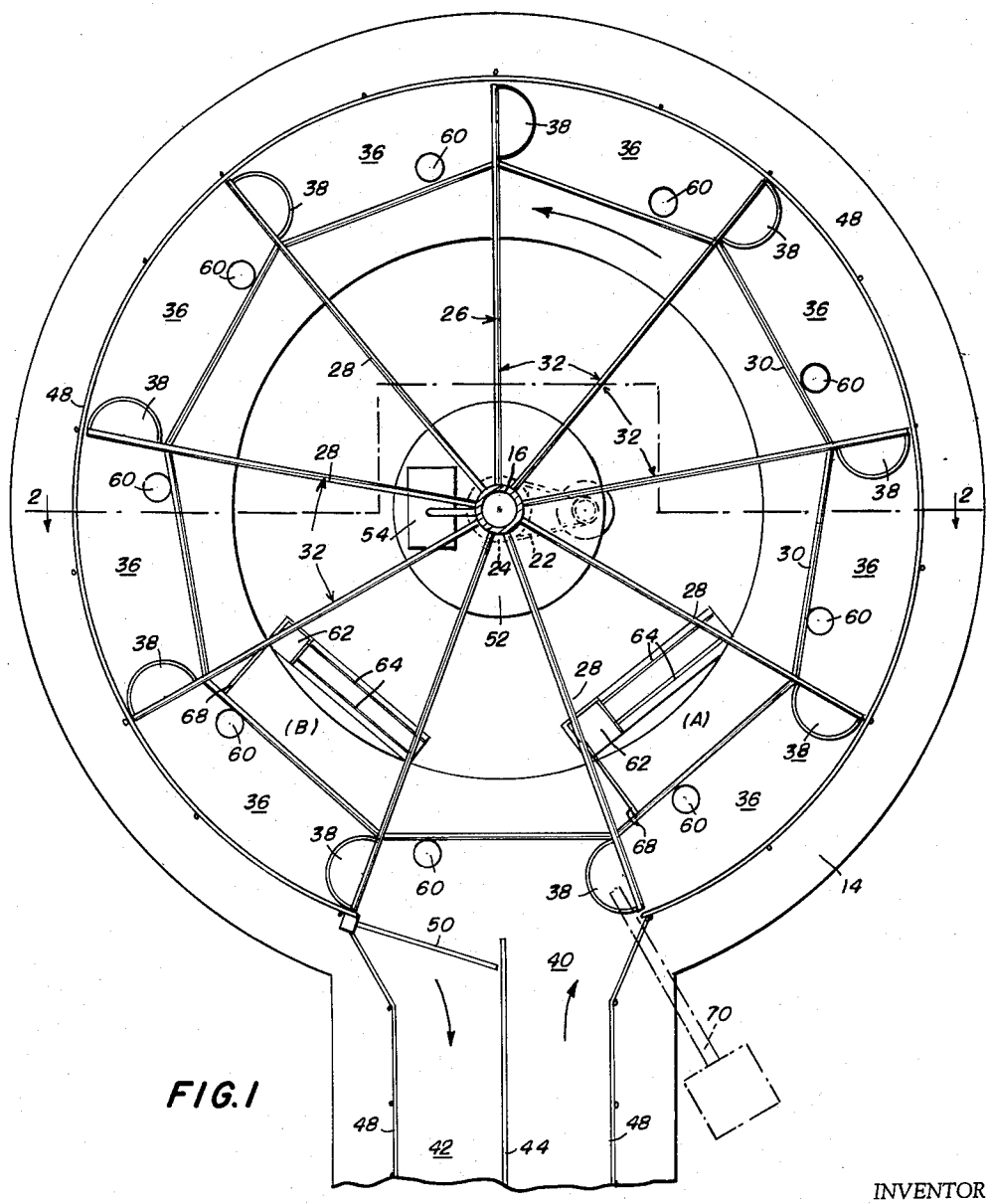
FIGURE 1 is a top plan view of the apparatus of this invention.

As illustrated in FIGURES 1 and 2, the milking system comprises a horizontal circular base 10 with an outer and upwardly extending peripheral wall 12 connecting with circular platform 14 in horizontal parallel spaced relation to the base 10. Obviously, the base 10 may be placed down below grade sufficiently so that the circular platform 14 is on ground level.

A tubular support 16 is rotatably mounted centrally in the base 10 by means of bearing assembly 18. This tubular support is rotated by means of electric motor 20 through chain 22 and sprocket 24 secured to the tubular support.

A horizontal stall framework 26 generally circular in shape is centrally mounted on the tubular support near its upper end for rotation therewith. This framework comprises a plurality of arms 28 extending radially outward from the tubular support 16. The arms are supported by angular supports 29 and indicated in FIGURE 2. Cross pieces 30 are secured to and between adjacent arms 28 to form a plurality of segments 32. In this particular embodiment nine segments are formed. It must be remembered that each segment must be of sufficient size at its extremity to provide space for the length of one cow. In other words, if a larger number of segments are needed so as to accommodate a larger number of cows it will be necessary to have a larger diameter framework 26 since the space needed by the cow is generally constant; the number of stalls or segments is therefore dependent on the framework periphery which is a function of the diameter thereof.

A generally rectangular panel 34 is secured to and depends from the extremity of each radial arm 28 to form a plurality of stalls 36. A plurality of rods 37 extend forwardly from the inward edge of each panel 34 to form with downwardly extending rods 39 the inner wall of the stalls while the fence 48 which extends around the periphery of the framework of each panel 34 there is mounted a feed bin 38. Obviously the bins for feed are in the forward end of each stall, thus their position depends on the direction of rotation of the framework 26 which is, as shown, counterclockwise.

As best illustrated in FIGURE 2, the vertical relationship between the platform 14 and the feed bin 38 is such that the cow may conveniently eat from the bin as the framework 26 rotates.

Referring to FIGURE 1, the platform 14 extends outwardly to form an entrance 40 and exit 42. A dividing wall 44 separates the entrance and exit whose outer sides are defined with fencing 48 which also extends around the entire rotating unit closely adjacent the outer edges of the panels 34. There is a vertically swinging bar 50 across the exit 42 adjacent the stall to prevent the cow from leaving the stall until the desired time.

As illustrated in FIGURE 2, tubular support 16 carries an annular platform 52 mounted just above the power means for rotating said support. This platform supports a vacuum pump 54 connected to the inside of tubular support 16. Power is supplied to the pump through a slip ring assembly 53 positioned at the top of support 16. Arms 28 which extend from support 16 are also hollow and connected to the inside of said support. Likewise, the cross pieces 30 are also hollow and connected to arms 28. Thus, vacuum developed by pump 54 is effective throughout the tubular support 16, the arms 28 and the cross pieces 30. Milking assemblies indicated diagrammatically as 60 are carried on cross pieces 30 and are connected to the vacuum line in said cross pieces. Obviously, there is one milking unit 60 for each stall 32 of which there are nine in this particular embodiment.

This milking arrangement requires two operators, one located in the position noted as A and another located at B. At position A the operator will spray the udder, feed and put the milker on the cow, while at position B the operator will take off the milker, record the milk weight and then release same to milk room. At both positions the operator sits on a seat 62 slidably mounted on parallel tracks 64. These parallel tracks 64 are mounted on base 10 by suitable supporting means 66 in such a manner that the tracks 64 are inclined slightly upwardly in the direction of rotation of the framework 26. A pivotally mounted bracket 68 is located on the lower inner corner of the panel 34. This arm pivots vertically and may be brought down behind and in contact with seat 62 so that as the framework 26 moves, it will carry with it the seat 62. Thus, the operator will be carried along with the walking cow in a given stall so that he may perform the necessary work for the specific station. As soon as the operator completes his work, he raises the arm 68 out of engagement with the seat and thereby allows the seat to roll back to the starting position ready to line up with the next stall and the cow therein.

Feed is delivered to station A by means of screw feed assembly 70 which feeds directly to the feed bin 38.

Any suitable means may be provided at station B to convey the milk from the milker to the bulk storage facility. Gravity or forced flow may be used depending on the cycle time involved.

The operation of this apparatus should be quite clear from the description of its elements, however, a brief summary is probably desirable to properly tie in all of the apparatus and thereby bring out the advantages of this system.

The device has nine stalls, hence will handle nine cows.

The rotary stall assemblage makes one complete cycle every four minutes, in other words, once the stalls are filled nine cows will be milked every four minutes. Two operators are required, one being positioned at station A and one at station B.

The cow enters through entrance 40 and passes into station A where the operator sprays the udder, and puts the milker on the cow. The operator at station A, which, of course, is the starting station, also feeds the cow waiting in line as he starts putting the milker on the cow in the stall at station A. As previously set forth, the entire assemblage of nine stalls moves continuously at the rate of one revolution every four minutes. This rate may be changed if the milking operation so requires.

The operator of station A is positioned on seat 62 which rides along tracks 64 in unison with the framework 26 and more particularly the stall holding the cow which is to receive the milker. As soon as the operator has completed the application of the milker he releases the seat from the framework 26 and due to the incline of the tracks 64 the seat returns to its starting position. After having the milker attached, the cow continues to walk around until station B is reached whereupon the operator at this station takes off the milker, weighs the milk and releases same to the milk room. After this the cow is released and leaves through exit 42.

In view of the above, it will now be apparent that this milking system is a very useful combination which is low in construction cost, inexpensive to operate and maintain, and yet makes it possible to perform all of the milking operations in an expeditious and orderly manner.

I claim:

1. A milking system for handling a plurality of cows, said system comprising a stall framework, means for centrally supporting said framework, the framework having a plurality of arms extending radially outward from said supporting means, cross pieces connecting the ends of the arms to form with adjacent pairs of arms a plurality of stall segments, means extending downwardly from the end portions of the arms to act as partitions to define the fore and aft stall portions and means for rotating the stall framework.

2. A milking system for handling a plurality of cows, said system comprising a central vertical support, a stall framework carried on said central support, said framework having a plurality of arms extending radially therefrom, cross pieces connecting the ends of the arms to form with adjacent pairs of arms a plurality of stall segments, feed bin supporting means extending downwardly from the end portions of each arm, a feed bin carried by each feed bin supporting means, and means for rotating the stall framework.

3. The invention as set forth in claim 2 and including a fence extending the major portion of peripheral path described by the rotating framework, the remaining portion of the peripheral path being provided with a divider to form an entrance and exit to and from the rotating framework.

4. The invention as set forth in claim 3 and wherein there is a sliding seat assembly positioned adjacent both entrance and the exit, said seat assemblies each being movable by engagement with the rotating framework so that the operator may follow the cow as the framework and the cow move.

5. A milking system for handling a plurality of cows, said system comprising a central vertical rotating support, a stall framework secured to said support for rotation therewith, a plurality of arms extending radially therefrom, cross pieces connecting the ends of the arms to form with adjacent pairs of arms a plurality of stall segments, divider means extending downwardly from the end portion of each arm, a feed bin mounted on the lower portion of each divider means, spacer means fastened to the inward edges of adjacent divider panels, said spacer means serving as the inner wall of the stall, a fence extending around the stall framework adjacent the peripheral path formed by the rotation of the ends of the framework arms, a portion of said fence being formed into an entrance to the stall segments, an immediately adjacent fence portion being formed into an exit, and means for rotating the central vertical support.

6. The invention as set forth in claim 5 and wherein a sliding seat is positioned adjacent the entrance inward of the spacer means and another sliding seat is positioned adjacent the exit inward of the spacer means, said seat assemblies each being movable by engagement with the rotating framework so that the operator may follow the cow as the framework and the cow move.

7. The invention as set forth in claim 6 and wherein the central vertical rotating support, the arms connected thereto and the cross pieces are hollow and form a fluid passageway, a vacuum pump connected to the fluid passageway to apply vacuum thereto for operating a milking machine adapted to be mounted on the cross pieces.

References Cited in the file of this patent

UNITED STATES PATENTS

| | | |
|---|---|---|
| 702,366 | Johnson | June 10, 1902 |
| 1,787,152 | Hapgood | Dec. 30, 1930 |
| 1,839,313 | Hibbs et al. | Jan. 5, 1932 |
| 2,236,851 | Haselton | Apr. 1, 1941 |
| 2,316,065 | Hapgood | Apr. 6, 1943 |

FOREIGN PATENTS

| | | |
|---|---|---|
| 69,909 | Denmark | Sept. 5, 1949 |